(12) United States Patent
Kravit et al.

(10) Patent No.: US 10,606,764 B1
(45) Date of Patent: Mar. 31, 2020

(54) FAULT-TOLERANT EMBEDDED ROOT OF TRUST USING LOCKSTEP PROCESSOR CORES ON AN FPGA

(71) Applicant: NORTHROP GRUMMAN SYSTEMS CORPORATION, Falls Church, VA (US)

(72) Inventors: Gregory D. Kravit, San Diego, CA (US); Kenneth R. Weidele, San Diego, CA (US); Kenneth F. McKinney, San Diego, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 261 days.

(21) Appl. No.: 15/722,651

(22) Filed: Oct. 2, 2017

(51) Int. Cl.
*G06F 11/00* (2006.01)
*G06F 12/14* (2006.01)
*G06F 21/12* (2013.01)
*G06F 21/57* (2013.01)
*G06F 11/16* (2006.01)

(52) U.S. Cl.
CPC ...... *G06F 12/1408* (2013.01); *G06F 11/1608* (2013.01); *G06F 11/1629* (2013.01); *G06F 21/123* (2013.01); *G06F 21/57* (2013.01); *G06F 2212/1052* (2013.01); *G06F 2221/2101* (2013.01); *H04L 2209/24* (2013.01)

(58) Field of Classification Search
CPC ..... G06F 12/1408; G06F 21/123; G06F 21/57
See application file for complete search history.

(56) References Cited

U.S. PATENT DOCUMENTS

| 4,168,396 | A | * | 9/1979 | Best | G06F 12/1408 713/190 |
| 4,817,140 | A | * | 3/1989 | Chandra | G06F 12/1408 380/277 |
| 6,065,135 | A | | 5/2000 | Marshall et al. | |
| 7,290,289 | B2 | * | 10/2007 | Janke | G06F 9/30189 726/34 |
| 7,496,786 | B2 | | 2/2009 | Graham et al. | |
| 8,006,100 | B2 | | 8/2011 | King et al. | |

(Continued)

OTHER PUBLICATIONS

Raytheon, "MYJK-185A, NSA-Certified Root of Trust Cryptographic Processor for Embedded Applications" www.raytheon.com/capabilites/cybersecurity/sis, copyright 2013, Raytheon Company, 2pgs.

*Primary Examiner* — Marc Duncan
*Assistant Examiner* — Jonathan D Gibson
(74) *Attorney, Agent, or Firm* — John A. Miller; Shumaker, Loop & Kendrick, LLP

(57) ABSTRACT

A field programmable gate array (FPGA) including a root of trust architecture. The architecture includes a system controller providing system control commands for the architecture and a cryptography processor for performing a hash or key operation for authentication of controller-embedded software and attestation of correct firmware in external system resources. The architecture also includes a lock-step fault-tolerant processor being responsive to messages from the system controller, and including a plurality of soft lock-step cores. Each soft core including separate memory and resources and operating on the same input, where each soft core provides output messages that are analyzed by a logic in the fault-tolerant processor that selects one of the messages to be output to the cryptography processor.

20 Claims, 1 Drawing Sheet

(56) References Cited

U.S. PATENT DOCUMENTS

| | | | |
|---|---|---|---|
| 8,516,551 B2 | 8/2013 | Smith et al. | |
| 8,631,247 B2 | 1/2014 | O'Loughlin et al. | |
| 8,738,932 B2 | 5/2014 | Lee et al. | |
| 9,071,446 B2 | 6/2015 | Kreft | |
| 10,089,194 B2 * | 10/2018 | Jain | G06F 11/1604 |
| 10,244,043 B1 * | 3/2019 | Sato | G05B 19/0426 |
| 10,417,153 B2 * | 9/2019 | Rota | G06F 11/2005 |
| 2001/0037450 A1 * | 11/2001 | Metlitski | G06F 12/1408 713/152 |
| 2004/0186979 A1 * | 9/2004 | Janke | G06F 9/30189 712/1 |
| 2005/0273602 A1 | 12/2005 | Wilson et al. | |
| 2008/0082772 A1 * | 4/2008 | Savagaonkar | G06F 12/145 711/163 |
| 2010/0262811 A1 * | 10/2010 | Moyer | G06F 11/1679 712/227 |
| 2011/0254602 A1 * | 10/2011 | Steiner | G06F 11/1679 327/158 |
| 2012/0102334 A1 * | 4/2012 | O'Loughlin | G06F 21/57 713/189 |
| 2012/0272006 A1 * | 10/2012 | Moyer | G06F 12/0848 711/125 |
| 2013/0019083 A1 * | 1/2013 | Cain | G06F 11/1492 712/203 |
| 2013/0262917 A1 * | 10/2013 | Takemori | G06F 11/2028 714/4.11 |
| 2015/0338835 A1 * | 11/2015 | Holler | G06F 9/544 700/79 |
| 2016/0046265 A1 * | 2/2016 | Heise | G06F 9/544 701/70 |
| 2017/0277898 A1 * | 9/2017 | Powell | G06F 21/602 |
| 2017/0357557 A1 * | 12/2017 | Jain | G06F 11/1604 |
| 2018/0039544 A1 * | 2/2018 | Scobie | G06F 11/142 |
| 2018/0165224 A1 * | 6/2018 | Brown | G06F 21/57 |
| 2018/0285296 A1 * | 10/2018 | Rota | G06F 15/17 |
| 2018/0349214 A1 * | 12/2018 | Johnson | G06F 9/54 |
| 2019/0004582 A1 * | 1/2019 | Rotem | G06F 1/3296 |
| 2019/0012242 A1 * | 1/2019 | Ozer | G06F 11/1629 |
| 2019/0087575 A1 * | 3/2019 | Sahita | G06F 21/57 |
| 2019/0098072 A1 * | 3/2019 | Sato | G05B 19/0426 |

* cited by examiner

FAULT-TOLERANT EMBEDDED ROOT OF TRUST USING LOCKSTEP PROCESSOR CORES ON AN FPGA

BACKGROUND

Field

This invention relates generally to a fault-tolerant embedded root of trust architecture implemented on a field programmable gate array (FPGA) and, more particularly, to an embedded root of trust architecture implemented on an FPGA, where the architecture employs a lock-step fault-tolerant processor including two or more lock-step cores that provide command and control for a separate but integrated embedded cryptography processing core or sub-system and that also support communications with other system components.

Discussion

Modern aircraft, both manned and unmanned, employ a vehicle management system that includes the necessary controllers and other hardware for flight operation of the aircraft. The various sub-systems in the vehicle management system often include safety critical systems that if they were to fail, could cause a catastrophic failure of the aircraft. Therefore, these systems must be designed to have a high degree of reliability against failure. However, because of the vast number of calculations and processes that occur in the vehicle management system, a component generally having a high degree of reliability may still be considered too unreliable. Therefore, safety critical systems on an aircraft typically require some type of fault tolerant system.

For many of the systems on an aircraft, fault tolerance is satisfied by providing redundant systems. However, for the digital processing often employed in the safety critical systems, such redundant applications were previously not possible at the processor. For digital computing systems, it is known to employ various algorithms that obtain the same information, where the data is compared and data that does not match is considered faulty.

Embedded root of trust architectures are increasingly being used in computing and embedded systems to provide the ability to perform trusted system boot procedures and other trusted functions. An embedded root of trust architecture is defined as a hardware component that facilitates the execution of digitally authenticated software and firmware loading that securely and persistently maintains cryptographic keys and/or that supports secure processing capabilities. Special components that support the embedded root of trust architecture in its operation include cryptographic function blocks, non-volatile memory blocks, physically unclonable functions, and fuse blocks, such as e-fuses and battery-backed random access memories. One such application is to store cryptographic keys or provide cryptography accelerated functions for resource-constrained processors.

Current root of trust architectures typically do not consider safety and generally do not contain fault-tolerant functionality. If the non-fault tolerant root of trust architecture is placed on a computing board that contains or is used in flight critical or safety-critical systems, the potential for single-point failure could lower the reliability of the flight critical hardware and make the hardware unsuitable for flight. In addition, if a non-fault-tolerant root of trust architecture is used in conjunction with a fault-tolerant main processor, then the use of the conventional root of trust architecture could violate the safety guarantees of the fault-tolerant processor if used in support of critical processes.

DETAILED DESCRIPTION OF THE EMBODIMENTS

The following discussion of the embodiments of the invention directed to an embedded fault-tolerant root of trust architecture implemented on a field programmable gate array (FPGA) is merely exemplary in nature, and is in no way intended to limit the invention or its applications or uses. For example, the discussion herein refers to the fault-tolerant root of trust architecture being provided in flight critical systems on an aircraft. However, the fault-tolerant root of trust architecture of the invention may have other applications.

The present invention proposes an embedded fault-tolerant root of trust architecture implemented on an FPGA that includes a lock-step fault-tolerant processor including two or more soft lock-step cores that provide command and control for a separate but integrated embedded cryptography processing core or sub-system, as well as to support communications with other system components. An FPGA is an integrated circuit that can be configured and programmed in a certain manner for a certain application after it is fabricated, and will typically have an array of programmable logic blocks and reconfigurable interconnects that allow the logic blocks to be interconnected. A soft lock-step core is a processor designed to provide redundancy and increase assurance in trust at the logical component level. Lock-step cores are physically and logically isolated from each other with their own dedicated resources, and each core reads the same instructions and performs the same operations in lock-step with each other. The resulting outputs from all of the cores are then either compared in a comparator or voted in voting logic, where the true output is then sent to external components and system resources.

The use of two or more lock-step cores for the invention as described herein provides an approach to symmetric high integrity processing that exploits the well-known safety-critical redundancy architectures used at the system and sub-system levels, such as flight control computers, but implements those principles at the component and sub-component level. The lock-step cores provide assurance of correct processing using redundancy in environments subject to errors occurring due to natural phenomena as well as possible nefarious actors. Thus, the root of trust architecture increases the reliability of the particular system without sacrificing the trust of the system. This allows the FPGA to be suitable for flight-critical and safety-critical applications, where current root of trust implementations are not suitable.

Figure 1:
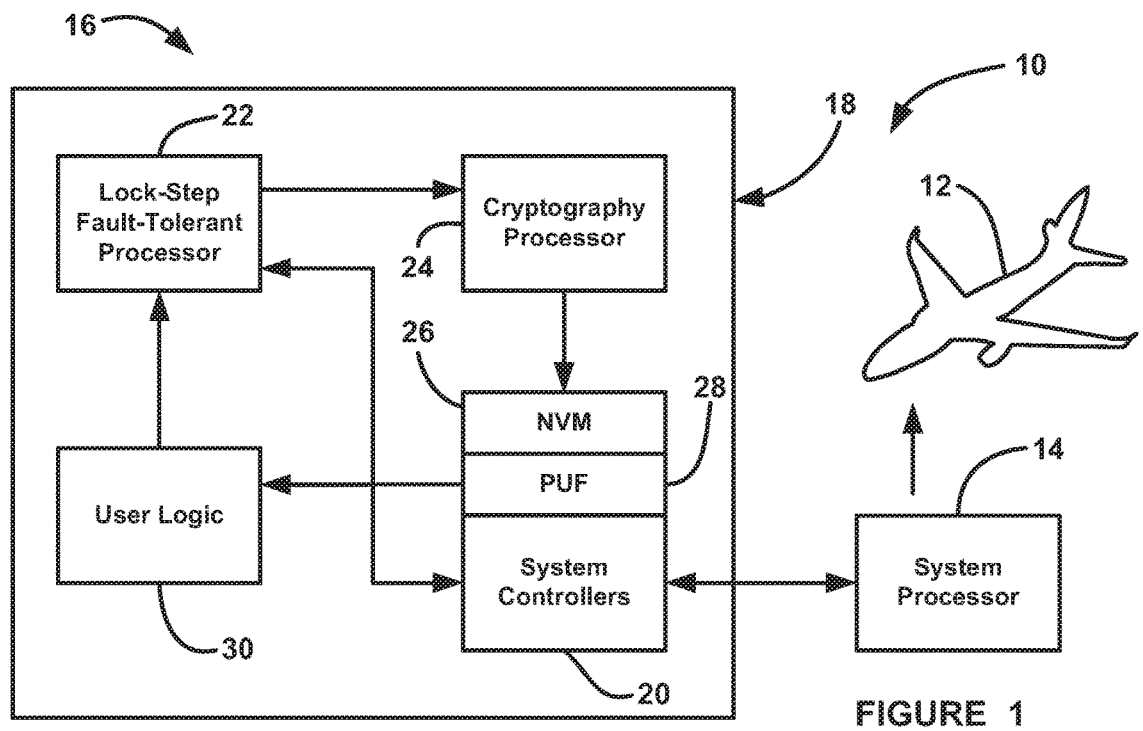
FIG. 1 is a block diagram of a root of trust architecture configured on an FPGA and including a lock-step fault-tolerant processor having two or more lock-step cores.

FIG. 1 is a block diagram of a computing system 10 that can be provided on an aircraft 12, and includes a system processor 14 that provides system processing operations for the specific application. The computing system 10 is intended to generally represent any of the known or contemplated systems on the aircraft 12, such as vehicle management systems, safety critical systems, etc., and would include at least one FPGA 16 that is programmed for the specific application in a manner well understood by those skilled in the art. The FPGA 16 includes a root of trust architecture 18 having one or more system controllers 20 that are in communication with the system processor 14 and receive commands therefrom, and provide data and other information to the processor 14. The root of trust architecture 18 includes a lock-step fault-tolerant processor 22 having more than one independent lock-step processing units, referred to herein as a lock-step core, that separately and independently operate on the same instructions and data to separately provide a desired result.

Upon receiving a command from the system processor 14, the system controllers 20 will send a message to the processor 22 to obtain certain cryptography keys for a certain operation. For example, the system controllers 20 may receive a command from the system processor 14 to determine whether the FPGA 16 can boot up in a safe manner. The processor 22 will then send a message to a cryptography processor 24 that includes accelerated functions and will perform some type of hash function or symmetric or asymmetric key operation to provide, for example, a digital signature for authentication of controller-embedded software for the FPGA 16. The process for providing asymmetric key cryptography employing private keys and public keys to encrypt and decrypt messages is well understood by those skilled in the art. The various keys employed for key cryptography are stored in a non-volatile memory (NVN) 26. Further, a physically unclonable function (PUF) 28 is employed to generate the necessary keys. The keys are provided by the NVM 26 or the PUF 28 as cipher data or plain text data to a user logic block 30 to determine if the keys are authentic, for example, do they match. The decision as to whether the keys are authentic determined by the user logic 30 is then sent to the processor 22 to analyze data from the system controllers 20 using multiple lock-step cores as described herein. Once the processor 22 performs its specific operation for the particular application, it will send a message to the system controller 20 to notify the system processor 14.

The fault-tolerant lock-step soft processor cores in the processor 22 act as a state machine coordinating the interactions between the cryptography processor 24, the system controllers 20 and the user logic 30, and is responsible for providing fault tolerance guarantees on root of trust operations. The processor 22 provides instructions to cryptography processors and brokers for all processing with external system resources. The cryptography processor 24 performs hash, symmetric and asymmetric key operations for root of trust, and provides additional cryptography processing capability to resource constrained system resources. The user logic 30 can contain digital logic to perform specific actions based on results from the cryptography processor 24, digital logic to perform authentication and attestation processing as directed by the processor 22, digital logic to handle signal and commands to external entities not handled by the system controllers 20, and digital logic to perform additional security related functions.

Figure 2:
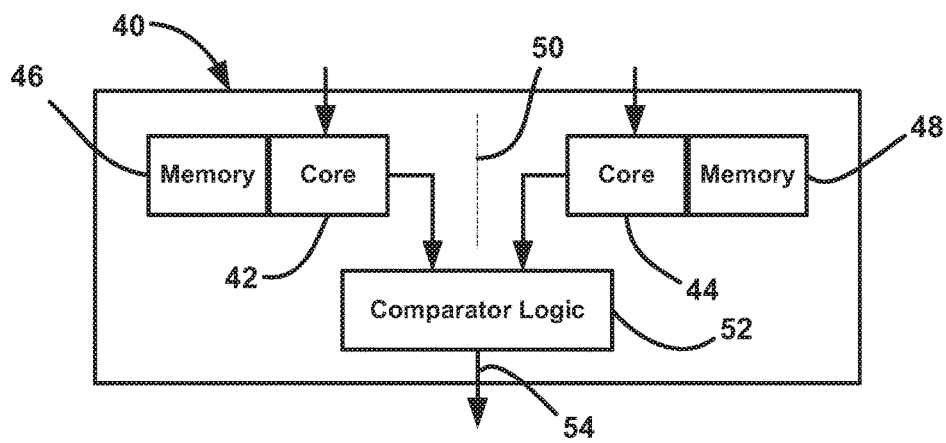
FIG. 2 is a block diagram of a lock-step fault-tolerant processor including dual cores that can be employed in the fault-tolerant processor shown in FIG. 1.

As mentioned, the present invention proposes multiple soft lock-step cores in the fault-tolerant processor 22 that simultaneously and in parallel operate on the various messages, instructions, commands and data received from the user logic 30 to provide a root of trust implementation in an embedded system at the sub-system level. FIG. 2 is a block diagram of a lock-step fault tolerant processor 40 including dual cores 42 and 44 illustrating one example that can be used for the processor 22. The core 42 includes its own memory and resources represented by block 46 and the core 44 includes its own memory and resources represented by block 48 so that the cores 42 and 44 operate on independent information to determine whether they arrive at the same result, where the separation of the cores 42 and 44 is represented by isolation fence 50. The cores 42 and 44 receive the same messages from the user logic 30, and process those messages in the same manner to output a message to comparator logic 52. The comparator logic 50 compares the two messages and provides one of those messages that best fits the desired result on line 54 to the system controllers 20.

Figure 3:
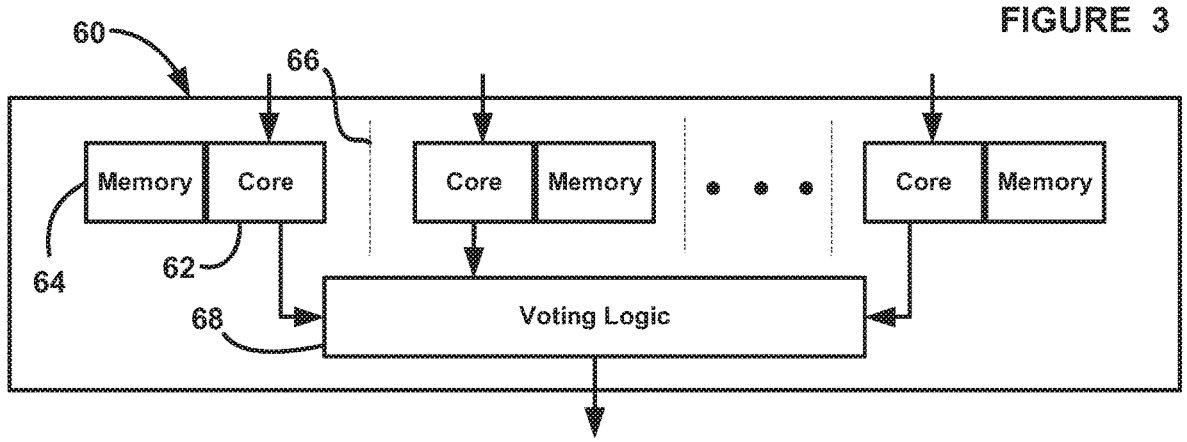
FIG. 3 is a block diagram of a lock-step fault-tolerant processor including three or more cores that can be employed in the fault-tolerant processor shown in FIG. 1.

The present invention contemplates any suitable number of parallel cores in the processor 22 to obtain the desired level of safety for the particular application. In order to represent this, FIG. 3 is a schematic block diagram of a lock-step fault tolerant processor 60 including N number of cores 62 each including its own memory and resources represented by box 64, where N is three or more of the cores 62, and where the cores 62 are separated by an isolation fence 66. Instead of the outputs of each of the cores 62 being provided to a comparator logic, the outputs are provided to a voting logic 68 that analyzes each of the outputs and selects that output which best provides the desired data integrity.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A field programmable gate array (FPGA) including a root of trust architecture, said architecture comprising:
   a system controller providing system control commands for the architecture;
   a cryptography processor for performing a hash, symmetric and/or asymmetric key operation to provide a digital signature for authentication of controller-em bedded software that will be used in an external system processor; and
   a lock-step fault-tolerant processor being responsive to messages from the system controller, said fault-tolerant processor including a plurality of soft lock-step cores, each soft lock-step core including separate memory and resources, where each core receives the same instructions and data and performs the same operations in lock-step with the other soft lock-step cores using its resources and provides an output message determined by the operations, said fault-tolerant processor including processor logic that selects one of the output messages from all of the soft lock-step cores to be output to the cryptography processor.

2. The FPGA according to claim 1 wherein the plurality of soft lock-step cores is two soft lock-step cores.

3. The FPGA according to claim 2 wherein the processor logic is a comparator logic.

4. The FPGA according to claim 1 wherein the plurality of soft lock-step cores is three or more soft lock-step cores.

5. The FPGA according to claim 4 wherein the processor logic is a voting logic.

6. The FPGA according to claim 1 wherein the architecture further comprises a non-volatile memory for storing keys for the cryptography processor.

7. The FPGA according to claim 6 wherein the architecture further comprises a physically unclonable function for generating the keys and/or a memory provisioned with keys.

8. The FPGA according to claim 6 wherein the architecture further comprises user logic that receives and authenticates the keys and provides authenticated keys to the fault-tolerant processor.

9. The FPGA according to claim 1 wherein the FPGA is part of an aircraft system on an aircraft.

10. The FPGA according to claim 9 wherein the aircraft system is a safety critical system.

11. A field programmable gate array (FPGA) including a root of trust architecture, said architecture comprising:
a system controller providing system control commands for the architecture;
a cryptography processor for providing authentication of controller-embedded software that will be used in an external system processor; and
a lock-step fault-tolerant processor being responsive to messages from the system controller, said fault-tolerant processor including a plurality of soft lock-step cores, each soft lock-step core including separate memory and resources, where each core receives the same instructions and data and performs the same operations in lock-step with the other soft lock-step cores using its resources and provides an output message determined by the operations, said fault-tolerant processor including processor logic that selects one of the output messages from all of the soft lock-step cores to be output.

12. The FPGA according to claim 11 wherein the plurality of soft lock-step cores is two soft lock-step cores.

13. The FPGA according to claim 12 wherein the processor logic is a comparator logic.

14. The FPGA according to claim 11 wherein the plurality of soft lock-step cores is three or more soft lock-step cores.

15. The FPGA according to claim 14 wherein the processor logic is a voting logic.

16. The FPGA according to claim 11 wherein the FPGA is part of an aircraft system on an aircraft.

17. The FPGA according to claim 16 wherein the aircraft system is a safety critical system.

18. A field programmable gate array (FPGA) including a root of trust architecture, said architecture comprising:
a system controller providing system control commands for the architecture;
a cryptography processor for performing a hash, symmetric and/or asymmetric key operation to provide a digital signature for authentication of controller-em bedded software that will be used in an external system processor;
a lock-step fault-tolerant processor being responsive to messages from the system controller, said fault-tolerant processor including a plurality of soft lock-step cores, each soft lock-step core including separate memory and resources, where each core receives the same instructions and data and performs the same operations in lock-step with the other soft lock-step cores using its resources and provides an output message determined by the operations, said fault-tolerant processor including processor logic that selects one of the output messages from all of the soft lock-step cores to be output to the cryptography processor;
a non-volatile memory for storing keys for the cryptography processor;
a physically unclonable function for generating the keys and/or a memory provisioned with keys; and
user logic that receives and authenticates the keys and provides authenticated keys to the fault-tolerant processor.

19. The FPGA according to claim 18 wherein the plurality of soft lock-step cores is two soft lock-step cores.

20. The FPGA according to claim 18 wherein the plurality of soft lock-step cores is three or more soft lock-step cores.

* * * * *